United States Patent Office 3,535,232
Patented Oct. 20, 1970

3,535,232
PREPARATION OF CATALYSTS
Paul Anthony Lawrance, Stanwell, Robert William Aitken, Yateley, and Alexander Porteous, Laleham on Thames, England, assignors to The British Petroleum Company Limited, London, England, a corporation of England
No Drawing. Filed Dec. 26, 1967, Ser. No. 693,121
Claims priority, application Great Britain, Jan. 10, 1967, 1,246/67
Int. Cl. C10g 13/02; B01j 11/40
U.S. Cl. 208—111                                  10 Claims

ABSTRACT OF THE DISCLOSURE

Refractory mixed oxide catalysts are prepared by partially hydrolysing an alkoxide of an element of Groups II to VI, adding to it another alkoxide of a Group II–VI element and completing the hydrolysis. The partial hydrolysis may be from 5 to 95%, particularly 25–75%. Preferred elements are silicon and aluminium.

A further catalytic component from Groups I and V to VIII may be added to the mixed oxide at any stage during or after its preparation, but preferably to the hydrolysed hydrogel. Preferred catalytic components are platinum group metals.

The catalysts may be used for hydrocarbon conversion, particularly hydrocracking, where results obtained show improvement over conventionally produced catalysts.

---

This invention relates to the preparation of refractory mixed oxide catalysts.

Refractory mixed oxide catalysts are well known in the chemical and petroleum industries. The best known are probably the silica-alumina catalysts used for cracking, but mixtures of various oxides of elements from Groups II, III, IV, V and VI have also been proposed, e.g., silica-magnesia, silica-zirconia, boria-alumina and so on. These mixed oxides are usually referred to as being acidic and many suggestions have been put forward to explain the acidity. A mixed oxide catalyst probably contains several different sites with varying acidities, which occur in a more or less random manner throughout the catalyst.

Further, although the catalysts are usually referred to as mixed oxide catalysts, the exact relationship between the oxides is not fully understood, e.g., how far the catalyst is a physical admixture of the oxides and how far there is chemical combination between the oxides. The present invention is concerned with a method of preparing mixed oxide catalysts which is believed to produce an ordered structure in which the acid sites are relatively evenly spaced and in which probably one or two types of acid site predominate.

According to the present invention, a method of preparing a refractory mixed oxide catalyst comprises partially hydrolysing an alkoxide of an element of Groups II to VI of the Periodic Table, adding to it an alkoxide of another element of Groups II to VI and further hydrolysing to complete the hydrolysis.

Any of the elements of Group II to VI which react with alcohols to form alkoxides may be used, but preferred elements are boron, magnesium, titanium, zirconium, phosphorus and chromium, and particularly silicon and aluminium. The alcohol used to form the alkoxide is not critical since it does not form part of the final product and the organic radical may be an alkyl, cycloalkyl or aryl group or a mixed group of any of these components. Alkyl radicals are preferred, for example ethyl or isopropyl radicals. For convenience of handling and recovery the group has, preferably, 1 to 8 carbon atoms. Thus particularly preferred alkoxides are tetra-ethyl ortho silicate and aluminium isopropoxide.

Which alkoxide is partially hydrolysed and which added later is not critical but conveniently the alkoxide of the element forming the major part of the mixed oxide catalyst is the one which is first partially hydrolysed. The amounts of the oxides in the catalyst may range from 5–95% wt. depending on the ultimate use for the catalyst. Particularly suitable catalysts are those with 55–95% wt. silica and 45–5% wt. of alumina. The extent of partial hydrolysis is desirably correlated with the amounts of oxides desired in the final catalyst so that the number of hydroxyl groups in the partially hydrolysed material is at least stoichiometrically equal to the amount of the second alkoxide.

The alkoxide to be partially hydrolysed is reacted under controlled conditions to prevent complete hydrolysis and the extent of hydrolysis is preferably from 5–95%, particularly 25–75%. The most convenient method of control is to limit the amount of water present, preferably to from 5–95% particularly 25–75% of the theoretical amount of water required for complete hydrolysis. Other features of this hydrolysis may follow known practice.

Thus the temperature may be from 0 to 150° C. and the time from ½ hour to 1 week. The hydrolysis medium may be pure water but is preferably dilute acid or dilute alkali. The acid or alkali strength is desirably not in excess of 15% and may conveniently be 0.1–1%. Increase in severity of conditions may cause gelatin and this is permissible although it may require more thorough mixing when the second alkoxide is added. Preferably conditions are chosen—i.e. low temperature, short duration and dilute acid or alkali—to prevent gelation.

The second alkoxide is then added to the partially hydrolysed alkoxide. Preferably the second alkoxide has not been partially hydrolysed, although a previous partial hydrolysis of this alkoxide also is possible. Preferably only one alkoxide is added to give a binary mixed oxide system, but if desired two or more alkoxides may be added together or in succession to give mixtures of three or more oxides. The partially hydrolysed alkoxide and other alkoxide are thoroughly admixed by, for example, stirring, to allow condensation to occur between the —OH groups of the partially hydrolysed alkoxide and the organic radicals of the second alkoxide.

The temperature in this step may be within the same range as for the partial hydrolysis e.g. 0–150° C. and to avoid heating or cooling it is preferably the same temperature. The duration may be ½ hour to 1 week.

Hydrolysis is completed by the addition of further water, which can be in excess of that theoretically required if desired. The temperature of this step may be from 0° C. to 150° C. and the time can be extended to from 10 minutes to 30 days to allow for aging of the resulting hydrogel if necessary. Again either pure water or dilute acid or alkali may be used.

Any or all of the stages outlined above can be carried out in the presence of a solvent for the alkoxides. The solvent should not of course hydrolyze the alkoxide and is preferably an organic solvent for example a hydrocarbon, alcohol or ether. The solvent should also be readily recoverable from the products of the hydrolysis and any excess water used. One of the products of the hydrolysis is an alcohol formed from the organic radical of the alkoxide, and a particularly convenient solvent is a further quantity of the alcohol which is produced e.g. isopropyl and/or ethyl alcohol. If the two or more alkoxides used have different organic radicals then they are preferably chosen so that the alcohols produced can be separately recovered both from each other and the solvent used by a simple treatment such as distillation.

The mixed-oxide hydrogel can be worked up into catalyst particles via the normal steps of washing, filtering, drying at e.g. 100–150° C. and calcining at e.g. 300–600° C. The final form of the catalyst can also be, in the usual way, granules, pellets, extrudates, beads or microspheroids.

Mixed oxide catalysts, because of their acidity, can be used as such for hydrocarbon conversion reactions particularly isomerisation and cracking. They may also be used as supports for further catalytic components selected from Groups I, and V to VIII of the Periodic Table, particularly components having hydrogenating/dehydrogenating activity selected from Groups VI$a$ or VIII. The components may be the elements themselves or compounds thereof such as oxides or sulphides.

The elements or compounds can be added to the mixed oxide catalysts at various stages in their preparation—to the hydrolysis mixture, to the hydrogel, or to the finished catalyst. The present invention includes a method of preparing a refractory mixed oxide catalyst by the steps described above together with the step of incorporating a further catalytic component selected from Groups I and V to VIII of the Periodic Table into the mixed oxide catalyst during or after its preparation.

Preferably the further catalytic component is added to the hydrogel after completion of the hydrolysis, since intimate admixing of the component with the support is thereby facilitated. When the component is a Group VIII metal, ion-exchange may occur between the hydroxyl groups of the gel and the metal, particularly when the metal is added in alkaline solution or as a complex of the metal and ammonium e.g. tetrammine platinum or palladium chloride or nickel ammonium formate.

The amounts of the catalytic metal may be in the general range 0.1 to 50% by weight of total catalyst. Particularly preferred amounts are Percent wt.
Platinum group metals (i.e. Ru, Rh, Pd, Os, Ir and Pt) _____ 0.1–5
Iron group metals _____ 1–50
Group VI$a$ metals (i.e. Cr, Mo and W) _____ 1–25

The above figures are calculated as metals but, as stated above, the elements may be present as compounds if desired. The platinum group metals are preferably present as metals and the preferred metals are platinum and palladium. The iron group metals may be present as metals or as oxides or sulphides. The Group VI$a$ metals are preferably present as oxides or sulphides.

Insofar as elements of Groups V and VI may be used both as components of the mixed oxide and as further catalytic components, it is preferred to use different elements in any given catalyst.

The mixed oxide catalyst with a further catalytic component on it may also be used for hydrocarbon conversion and when the further component is a Group VI$a$ and/or Group VIII element or compound thereof, it is particularly useful for hydrocatalytic processes e.g. hydrocracking, isomerisation, denitrogenation, desulphurisation and reforming. It has been found that, in hydrocracking, a catalyst with a silica-alumina support prepared according to the present invention is markedly more active than a similar catalyst with a conventional silica-alumina support such as is now commercially used for catalytic cracking.

The process conditions under which catalysts of the present invention may be used for some of the most important processes are given below:

| | Cat. cracking | Hydro-cracking | Desulphurisation and denitrogenation |
|---|---|---|---|
| Temperature, ° F_____ | 800–100 | 500–850 | 600–850 |
| Pressure, p.s.i.g._____ | 5–20 | 50–5000 | 50–5000 |
| Space velocity, v./v./hr___ | 0.1–20 | 0.1–20 | 0.1–20.0 |
| Hydrogen treating rate, s.c.f./brl__ | Nil | 1000–40,000 | 100–40,000 |

The feedstocks for the three processes given above are preferably petroleum fractions boiling above 150° C., particularly petroleum distillate fractions boiling within the range 250–650° C.

The invention is illustrated by the following examples.

EXAMPLE 1

208 g. of tetraethylorthosilicate were dissolved in 400 ml. of isopropyl alcohol and to this solution was added 36 ml. of deionised water. During the addition the mix was stirred vigorously. This solution, containing the compound Si(OEt)$_2$(OH)$_2$, was heated to 70° C. 24 g. of aluminium isopropoxide were dissolved in 400 ml. of ispropyl alcohol at 70° C. The two solutions both at 70° C. were mixed with vigorous stirring. After stirring for 1½ hours one litre of a one percent weight NH$_4$OH solution was added. The gelation and ageing process was continued for 72 hours.

The aged gel was broken up and successively reslurried in water and filtered, three times. It was then dried at 120° C.

Palladium was added to the silica-alumina by exchange using tetrammine palladium (II) chloride. 85 g. of the dried gel were slurried in 225 ml. of deionised water. To this was added a solution containing 0.85 g. tetrammine palladium (II) chloride dissolved in 225 ml. of water. The addition took about five hours. The catalyst was then filtered, reslurried, filtered again and dried at 120° C. The dried catalyst was formed into 8–16 mesh granules.

Before use the catalyst was carefully calcined in a bed through which air was flowing at the rate of one litre/hour of air per ml. of catalyst. During the calcination the catalyst temperature was raised from ambient to 500° C. in 15 hours and maintained at 500° C. for two hours. The catalyst had the following analysis on a stable at 1020° F. basis.

Palladium content, percent wt.—0.40
Sodium content, percent wt.—0.005
Silicon content, percent wt.—38.9 (equivalent to 83.0 percent wt. SiO$_2$)
Aluminium content, percent wt.—9.0 (equivalent to 17.0 percent wt. Al$_2$O$_3$)
Surface area—328 m.$^2$/g.
Pore volume—0.18 ml./g.

The catalyst prepared as described above was tested for hydrocracking activity using n-heptane as feedstock under the following conditions:

Pressure—Atmospheric
Hydrogen to Hydrocarbon mole ratio—7.4:1
Space velocity—480 volumes of vapour/volume of catalyst/hour The temperature used and results obtained are compared with those for a catalyst of the same weight of palladium on a conventional silica-alumina in Table 1. It can be seen that the catalyst prepared by the partial hydrolysis method is considerably more active than the conventional catalyst.

TABLE 1

| | Conversion of n-heptane feed, percent wt. at ° C. | | |
|---|---|---|---|
| | 250° | 300° | 350° |
| Palladium on commercial silica-alumina cracking catalyst (25% alumina)_____ | 5.1 | 24.6 | 79.2 |
| Catalyst described above. Palladium on aluminium-silicon alkoxide-hydroxide catalyst_____ | 28.2 | 83.4 | 100 |

EXAMPLE 2

140 g. of tetraethylorthosilicate were dissolved in 300 ml. of isopropyl alcohol. To this was added 10 ml. of water and 2 ml. of a one percent weight hydrochloric acid solution. The mix was refluxed for one hour. 16 ml. of aluminium isopropoxide were dissolved in 300 ml. of isopropyl alcohol. This was added to the partially hydrolysed ethylorthosilicate solution together with 2 ml. of one percent weight hydrochloric acid solution. The mix was again refluxed for one hour and then left to stand overnight. 700 ml. of a one percent solution of NH₄OH were added to the mix with constant stirring. When addition was complete stirring was continued for 1½ hours; the gel was then aged for 72 hours.

The aged gel was broken up and successively reslurried in water and filtered three times. It was then dried at 120° C.

Platinum was added to the silica-alumina by exchange using tetrammine platinum (II) chloride. 60 g. of the dried gel were slurried in 170 ml. of deionised water. To this was added a solution of 0.60 g. of tetrammine platinum chloride in 170 ml. water. The addition was made over five hours. The catalyst was then filtered, reslurried, filtered again and dried at 120° C. The dried catalyst was formed into 8–16 mesh granules.

Before use the catalyst was carefully calcined to 500° C. in a bed through which air was passed at a rate of one litre/hour of air per ml. of catalyst. The catalyst had the following analysis on a stable at 1020° F. basis:

Platinum, percent wt.—0.52
Sodium, percent wt.—0.005
Surface area, m₂/g.—390
Pore volume, ml./g.—0.28

The catalyst was tested in the same hydrocracking activity test as was used in Example 1. The results, which are shown in Table 2, indicate that this catalyst was even more active than the catalyst from Example 1.

TABLE 2

|  | Conversion of n-heptane feed, percent wt. at ° C. | | |
|---|---|---|---|
|  | 350° | 300° | 350° |
| Catalyst described above. Platinum on aluminium-silicon alkoxide hydroxide catalyst | 31.1 | 87.2 | 100 |

EXAMPLE 3

Tetraethylorthosilicate (466.5 g.) was dissolved in absolute ethyl alcohol (2 litres). For partial (50 percent) hydrolysis, 75 ml. of an aqueous solution containing dodecatungstosilicic acid (30.0 g.) and concentrated hydrochloric acid (3 ml.) was added.

Aluminium isopropoxide (190.5 g.) was dissolved in calcium chloride dried, sulphur-free toluene (2 litres).

The aluminium isopropoxide solution was slowly added, with vigorous stirring, to the tetraethylorthosilicate solution and stirring continued for 16 hours. After gelation, the silica-alumina cogel was reslurried twice with 4 litres of 10 percent NH₄OH, centrifuged, filtered and dried overnight at 110° C. The weight of dried material was about 190 g.

To increase its tungsten content this material (122 g.) was impregnated for 19 hours with 200 ml. of a solution containing ammonium metatungstate (33.4 g.).

The solid material was vacuum filtered, spread on trays and dried overnight at 110° C. The dried catalyst was pelleted to 3/16 inch pellets, crushed to 10–12 mesh granules and calcined for 2 hours at 550° C.

The finished catalyst had a tungsten content of 6.1% wt., and a silicon content of 31.4% wt. (equivalent to 67.0% wt. SiO₂), the balance being alumina. The pore volume was 0.21 ml./g. and the surface area 221 m.²/g.

EXAMPLE 4

Tetraethylorthosilicate (780.5 g.) was dissolved in absolute ethyl alcohol (2 litres). Deionised water (130 ml.) and concentrated hydrochloric acid (4 ml.) were added and stirred continuously for 2 hours.

Aluminium isopropoxide powder (300.5 g.) was dissolved in benzene (2 litres).

The aluminium isopropoxide solution was added with vigorous stirring to the tetraethylorthosilicate solution and stirring continued overnight. After gelation, the silica-alumina cogel was reslurried twice with 4 litres of 10 percent NH₄OH, centrifuge filtered and dried for 16 hours at 110° C.

122 g. of the dried silica-alumina base were impregnated for 2 hours with 200 ml. of an impregnating solution containing ammonium metatungstate (33.4 g.).

The solid material was filtered, spread on trays and dried overnight at 110° C. The dried catalyst was pelleted to 3/16 inch pellets crushed to 10–12 mesh granules and then calcined for 2 hours at 550° C.

The finished catalyst had a tungsten content of 7.9% wt. and a silicon content of 30.8% wt. (equivalent to 66.0% wt. SiO₂), the balance being alumina. The pore volume was 0.12 ml./g. and the surface area 118 m.²/g.

EXAMPLE 5

The catalysts prepared in Examples 3 and 4 were tested for hydrocracking activity and compared with equivalent 10% wt. tungsten on 75% silica-25% alumina catalysts in which the Si-Al base was prepared from sodium metasilicate and aluminium sulphate.

The hydrocracking process conditions were:

Pressure—1500 p.s.i.g.
Space velocity—1.0 v./v./hr.
Gas recycle rate—10,000 s.c.f. of H₂/B
Temperature—adjusted to give 60% wt. conversion to material boiling below 371° C.
Feedstock—Iranian wax distillate of 352° to 568° C. ASTM boiling range, pretreated to a nitrogen content of 36 p.p.m. and a sulphur content of 0.015% wt.
Duration—120 hours The results are shown in Table 3 below:

TABLE 3

| Catalyst | Surface area, ml./g. | | Temperature for 60% wt. conversion to 371° C., ° F. | Percent wt., C⁵–177 gasoline produced | Iso/normal ratios | |
|---|---|---|---|---|---|---|
|  | Base | Catalyst |  |  | C⁵ | C⁶ |
| Example 3 | 474 | 221 | 696 | 28.6 | 15.0 | 24.5 |
| Example 4 | 322 | 118 | 730 | 31.0 | 12.6 | 23.7 |
| Catalyst¹ | 457 | 238 | 735 | 23.2 | 5.9 | 8.3 |
|  |  | 282 | 718 | 24.0 | 12.5 | 19.5 |
|  | 470 | 277 | 738 | 25.5 | 7.2 | 7.5 |
|  | 360 | 137 | 730 | 24.7 | 7.3 | 11.9 |

¹ From sodium metasilicate and aluminium sulphate (4 different samples).

The results in Table 3 show that the catalysts of the present invention produce more gasoline which has a higher content of iso-paraffins. They also show that, despite some overlap in the range of temperatures for 60% wt. conversion, the catalyst of Example 3 shows a temperature advantage of 22° F. over the best comparative catalyst and a gasoline yield advantage of 4.6% wt.

EXAMPLE 6

122 g. of the dried silica-alumina base used in Example 4 were added to 300 ml. of a solution of nickel nitrate (78.5 g.). The mixture was allowed to stand at room temperature for 3 hours. The ion exchanged hydrogel was separated from the solution by vacuum filtration, washed with 250 ml. of deionised water and then refiltered.

The solid material was spread on trays and dried for 16 hours at 110° C. The dried catalyst was pelleted to 3/16 inch pellets, crushed to 10–12 mesh granules and then calcined for 2 hours at 550° C.

The finished catalyst had a nickel content of 4.2% wt., and a silicon content of 32.4% wt. (equivalent to 69.0% wt. $SiO_2$), the balance being alumina. The pore volume was 0.20 ml./g. and the surface area 240 m.$^2$/g.

The catalyst was tested for hydrocracking under the conditions given in Example 5 with the following results:

Temperature for 60% wt. conversion to <371° C.—644° F.

$C_5$—177% gasoline produced—34% wt.

Iso/normal ratios:
$C_5$—25.5.
$C_6$—43.8

We claim:

1. A method of preparing a refractory mixed oxide catalyst comprising partially hydrolysing an alkoxide of an element of Groups II to VI of the Periodic Table to an extent of 5 to 95%, adding to the partially hydrolysed alkoxide an alkoxide of another element of Groups II to VI and further hydrolysing to complete the hydrolysis.

2. A method as claimed in claim 1 wherein the hydrolysis is carried out to an extent of 25–75%.

3. A method as claimed in claim 1 wherein the partial hydrolysis is controlled by limiting the amount of water present.

4. A method as claimed in claim 1 wherein the alkoxides used are alkoxides of silicon and aluminium having from 1 to 8 carbon atoms.

5. A method as claimed in claim 1 wherein all three stages of partial hydrolysis, adding of further alkoxide and further hydrolysis are carried out at 0 to 150° C.

6. A method of preparing a catalyst comprising partially hydrolysing an alkoxide of an element of Groups II to VI of the Periodic Table, to an extent of 5 to 95%, adding to the partially hydrolysed alkoxide an alkoxide of another element of Groups II to VI, further hydrolysing to complete the hydrolysis, and incorporating from 0.1 to 50% wt. of a further catalytic component selected from Groups I and V to VIII of the Periodic Table into the mixed oxide catalyst during or after its preparation.

7. A method as claimed in claim 6 wherein the further catalytic component is from 0.1 to 5% wt. of a platinum group metal.

8. A method as claimed in claim 6 wherein the further catalytic component is added to the hydrogel resulting after completion of the hydrolysis.

9. A process for the hydrocracking of hydrocarbon feedstocks to increase the extent of conversion of the hydrocracking feedstock and to increase the quantity and quality of the desired conversion product, comprising contacting the feedstock at a temperature in the range 600–850° F., and a pressure in the range 50–5000 p.s.i.g. with a refractory mixed oxide catalyst prepared by partially hydrolyzing an alkoxide of an element of Groups II to VI of the Periodic Table, to an extent of 5 to 95%, adding to said partially hydrolyzed alkoxide an alkoxide of another element of Groups II to VI, further hydrolyzing the resulting mixture to complete the hydrolysis, and incorporating from 0.1 to 50% wt. of a further catalytic component selected from Groups I and V to VIII of the Periodic Table into the mixed oxide catalyst during or after its preparation, and recovering the desired improved conversion product.

10. A process as claimed in claim 9 wherein the hydrocarbon feedstock is a distillate petroleum fraction boiling above 150° C.

References Cited

UNITED STATES PATENTS

| | | | |
|---|---|---|---|
| 2,154,079 | 4/1939 | Weiss | 252—430 |
| 2,469,733 | 5/1949 | Kearby | 208—120 |
| 2,592,775 | 4/1952 | West | 252—453 |
| 2,713,037 | 7/1955 | Kimberlin | 252—453 |

PATRICK P. GARVIN, Primary Examiner

C. F. DEES, Assistant Examiner

U.S. Cl. X.R.

208—112; 252—453, 455, 456, 457, 458, 460

(P-2069)
PO-1050
(5/69)

UNITED STATES PATENT OFFICE
CERTIFICATE OF CORRECTION

Patent No. 3,535,232      Dated October 20, 1970

Inventor(s) Paul Anthony Lawrance, Robert William Aitken and Alexander Porteous

It is certified that error appears in the above-identified patent and that said Letters Patent are hereby corrected as shown below:

Col. 2, line 29, for "gelatin" read --gelation--;

Col. 3, lines 65-75 in the column headed "Cat. cracking", for "800-100" read --800-1000--;

Col. 5, line 26, for "m2/g." read --$m^2/g$--;

Col. 5, TABLE 2, under the heading "Conversion of n-heptane feed, percent wt. at °C.", in the left-hand column, for "350°" read --250°--;

Col. 5, line 61, for "(190.5g)" read --(180.5g)--;

Col. 6, TABLE 3, for "$C^5$-177" read --$C_5$-177--;

Col. 6, TABLE 3, for "$C^5$" read --$C_5$--;

Col. 6, TABLE 3, for "$C^6$" read --$C_6$--.

Signed and sealed this 30th day of March 1971.

(SEAL)
Attest:

EDWARD M. FLETCHER, JR.
Attesting Officer

WILLIAM E. SCHUYLER, JR.
Commissioner of Patents